Figures 1, 2, 3, 4, 5:
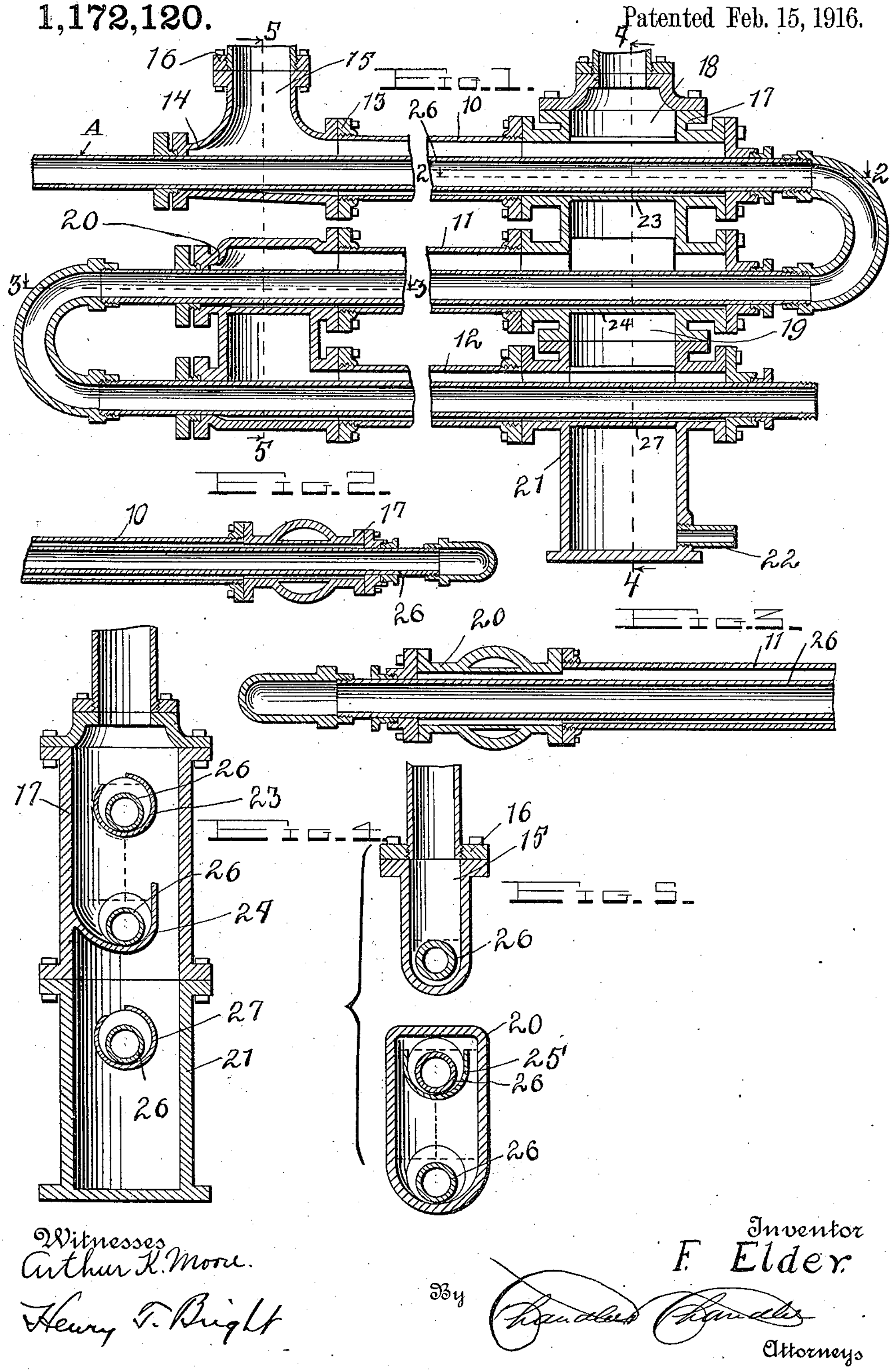

F. ELDER.

APPARATUS FOR EVAPORATING LIQUIDS.

APPLICATION FILED APR. 9, 1913.

1,172,120. Patented Feb. 15, 1916.

Witnesses
Arthur K. Moore.
Henry T. Bright

Inventor
F. Elder.
By Chandlee & Chandlee
Attorneys

THE COLUMBIA PLANOGRAPH CO., WASHINGTON, D. C.

UNITED STATES PATENT OFFICE.

FRED ELDER, OF VINCENNES, INDIANA, ASSIGNOR OF ONE-FOURTH TO JOSEPH L. EBNER AND CLEMENT B. WISSING, OF VINCENNES, INDIANA.

APPARATUS FOR EVAPORATING LIQUIDS.

1,172,120. Specification of Letters Patent. Patented Feb. 15, 1916.

Application filed April 9, 1913. Serial No. 759,988.

*To all whom it may concern:*

Be it known that I, FRED ELDER, a citizen of the United States, residing at Vincennes, in the county of Knox, State of Indiana, have invented certain new and useful Improvements in Apparatus for Evaporating Liquids; and I do hereby declare the following to be a full, clear, and exact description of the invention, such as will enable others skilled in the art to which it appertains to make and use the same.

This invention relates to an apparatus for evaporating liquids.

The object of the invention resides in the provision of an apparatus of the character named in which the liquid flowing through the liquid conveying pipes will be maintained at a predetermined level whereby a liberating surface sufficient in area to allow dry vapor to be formed will be assured.

A further object of the invention resides in the provision of an apparatus of the type named in which maximum efficiency will always be secured owing to the fact that the liquid can under no circumstances rise beyond a predetermined level and fill the liquid conveying pipes.

A still further object of the invention resides in the provision of an apparatus for evaporating liquids in which all the parts are readily accessible for cleaning and replacement without dismantling the apparatus.

Another object of the invention resides in the provision of an apparatus of the type referred to which will be simple in construction, strong, durable and which may be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical section of a small unit of an evaporating apparatus constructed in accordance with the invention; Fig. 2, a section on the line 2—2 of Fig. 1; Fig. 3, a section on the line 3—3 of Fig. 1; Fig. 4, a section on the line 4—4 of Fig. 1, and Fig. 5, a section on the line 5—5 of Fig. 1.

Referring to the drawings the apparatus is shown as comprising a plurality of liquid conveying pipes 10, 11 and 12 which have threaded on each end a collar 13. Secured to one end of the pipe 10 is a casing 14 with the interior of which said pipe 10 communicates. This casing 14 is provided with a liquid inlet 15 to which is attached a supply pipe 16 leading from a suitable liquid supply. Secured to the end of the pipe 10 remote from the casing 14 is a casing 17 provided at its upper end with a vapor outlet 18 and at its lower end with a liquid outlet 19. It will be noted that the interior of the casing 17 is in communication with the pipe 10 and also in communication with the pipe 11 which is secured to said casing just below the pipe 10. The end of the pipe 11 remote from the casing 17 is secured to and communicates with the interior of a casing 20. The pipe 12 is also secured to the casing 20 just beneath the pipe 11 and likewise communicates with the interior of said casing 20. The end of the pipe 12 remote from the casing 20 is connected to and communicates with the interior of a casing 21 which latter is connected at its upper end to the casing 17 with its interior communicating with the interior of said casing 17. The lower end of the casing 21 is provided with a liquid discharge 22. Constructed in the casing 17 and forming substantially a continuation of the pipe 10 is a trough 23 which is so arranged that when the liquid supplied to the pipe 10 rises beyond a predetermined level said liquid will flow over one side of the trough 23 and pass downwardly in the casing. In this manner it will be apparent that the liquid in the pipe 10 is always maintained at a predetermined level and that the requisite liberating surface and vapor space in said pipe is assured. Constructed in the casing 17 in line with the pipe 11 is a trough 24 which has the side thereof adjacent the overflow side of the trough 23 extended to and suitably connected with the wall of the casing 17. By this construction it will be apparent that all of the liquid which overflows from the trough 23 will be caught in the trough 24 and then passed through the pipe 11. Constructed in the casing 20 in line with the pipe 11 is a trough 25 which is so arranged and formed that when the liquid in the pipe 11 rises above a predetermined level it will flow over the edges of said trough 25 downwardly in the casing 20 and thence through the pipe, into a trough 27 constructed in the casing 21 and similar to the trough 23. The liquid overflowing from the trough 27 is delivered to the interior of the casing 21 and then passed out through the discharge 22. Passing through the pipes 10, 11, 12, casings 14, 17, 20, 21 and troughs, 23, 24 and 25 are sections 26 of a continuous steam pipe A. These sections 26 of the pipe A are disposed eccentrically within the pipes 10, 11 and 12 with their centers disposed beneath the centers of the pipes 10, 11 and 12 respectively so that the upper sides of these sections will always be positioned beneath the level of the liquids in respective pipes 10, 11 and 12.

In the use of the apparatus steam is turned into the pipe A and liquid into the casing 14 from the supply pipe 16. This liquid will rise in the pipe 10 until it has filled the trough 23 to the capacity of the latter. The liquid will then flow over one side of the trough 23 and pass downwardly to the trough 24 and then through the pipe 11 into the trough 25. When the liquid has filled the trough 25 to its capacity it will flow over the side edges of said trough and pass downwardly in the casing 20 and thence through the pipe 12 into the trough 27 from which it will overflow into the casing 21 and pass out through the discharge 22. It will be noted that as the steam flows in the same direction as the liquid in the apparatus it will result in the hottest steam coming in contact with the coldest liquid and cause the liquid to heat rapidly and give the evaporator its maximum efficiency. It will be further noted that as the steam pipe sections 26 are arranged to be entirely submerged in the liquid throughout the greater portion of their lengths the liquid will always receive the maximum heat of the steam.

While the apparatus has been described in connection with its use as an evaporator it can be employed with equal facility as a condenser or absorber. To employ the apparatus as a condenser or absorber it will necessitate few changes and these only in accessory piping, the main body of the apparatus remaining the same.

What I claim is:—

1. An evaporating apparatus comprising a plurality of parallel spaced liquid pipes one of the limiting pipes having a liquid inlet at one end, hollow heads connecting adjacent pipes, the heads at the ends of the pipes remote from the liquid inlet communicating with each other and the uppermost communicating head being provided with a vapor outlet, a heating pipe extending through each of the first named pipes, and means for maintaining the liquid in each of the first named pipes at a constant level above the contained heating pipe.

2. An evaporating apparatus comprising a plurality of parallel spaced liquid conveying pipes, one of the limiting pipes having a liquid inlet at the end, hollow heads connecting adjacent liquid conveying pipes, heating pipes extending longitudinally through respective liquid conveying pipes and through said heads, a trough formed integral with and connecting opposite walls of each head and encircling the uppermost heating pipe disposed in the head, the side edges of said trough being at a height relative to the heating pipe to maintain the liquid in the liquid conveying pipe at a constant level above the heating pipe, the heads at the ends of the liquid conveying pipe remote from the liquid inlet communicating with each other, and troughs formed integral with and connecting opposite walls of each head respectively and encircling respective lowermost heating pipes in each head, said last named troughs having a greater depth than the first named troughs and being positioned to receive the overflow of said first named trough.

In testimony whereof, I affix my signature, in the presence of two witnesses.

FRED ELDER.

Witnesses:
C. B. Wissing,
W. S. Pressler.

Copies of this patent may be obtained for five cents each, by addressing the "Commissioner of Patents, Washington, D. C."